United States Patent
Matsuo

(10) Patent No.: US 8,917,884 B2
(45) Date of Patent: Dec. 23, 2014

(54) DEVICE FOR PROCESSING SOUND SIGNAL, AND METHOD OF PROCESSING SOUND SIGNAL

(75) Inventor: Naoshi Matsuo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1079 days.

(21) Appl. No.: 12/458,957

(22) Filed: Jul. 28, 2009

(65) Prior Publication Data

US 2010/0111325 A1    May 6, 2010

(30) Foreign Application Priority Data

Oct. 31, 2008   (JP) ................. 2008-281478

(51) Int. Cl.
- H04R 3/04 (2006.01)
- H04R 5/033 (2006.01)
- H04R 3/00 (2006.01)
- G01C 21/36 (2006.01)

(52) U.S. Cl.
CPC ............ H04R 3/005 (2013.01); G01C 21/3664 (2013.01)
USPC ........... 381/92; 94/97; 94/98; 94/309; 94/310

(58) Field of Classification Search
USPC ........................ 381/92, 94.7, 97, 98, 309, 310
See application file for complete search history.

(56) References Cited

U.S. PATENT DOCUMENTS

| | | | |
|---|---|---|---|
| 2003/0142835 A1* | 7/2003 | Enya et al. ....................... | 381/86 |
| 2003/0179890 A1 | 9/2003 | Matsuo | |
| 2005/0220312 A1* | 10/2005 | Kasai et al. ..................... | 381/97 |
| 2006/0188111 A1* | 8/2006 | Kihara et al. ................... | 381/92 |

FOREIGN PATENT DOCUMENTS

| | | |
|---|---|---|
| JP | 11-102197 | 4/1999 |
| JP | 11-234790 | 8/1999 |
| JP | 2003-153372 | 5/2003 |

OTHER PUBLICATIONS

Richard Radke et al., "Audio Interpolation for Virtual Audio Synthesis", AES 22nd International Conference on Virtual, Synthetic and Entertainment Audio, Jun. 2002, pp. 1-7.
German Office Action issued on Aug. 20, 2010 in a corresponding German patent application.
Masato Abe, "Estimation of sound sources using many sensors". The Journal of Acoustical Society of Japan, vol. 51 No. 5 (1995), pp. 384-389.
Shinichi Tanigawa et al., "Direction-of-Arrival Estimation of Speech Using Virtually Generated Multichannel Data from Two-Channel Microphone Array", Transactions of the Institute of Electronics, Information and Communication Engineers, vol. J85-A, No. 2, Feb. 2002, pp. 153-161.
Japanese Office Action mailed Jul. 10, 2012 issued in corresponding Japanese Patent Application No. 2008-281478.

* cited by examiner

*Primary Examiner* — Duc Nguyen
*Assistant Examiner* — George Monikang
(74) *Attorney, Agent, or Firm* — Staas & Halsey LLP

(57) ABSTRACT

A signal processing device includes at least two sound signal input elements, an orthogonal transformer, a phase difference determiner, and a virtual spectrum generator. Two sound signals in a time domain are received from the two respective sound signal input elements. The orthogonal transformer orthogonally transforms the two sound signals in the time domain into two respective spectral signals in a frequency domain. The phase difference determiner determines a phase difference between the two spectral signals in the frequency domain. The virtual spectrum generator generates a virtual spectral signal in the frequency domain in accordance with the phase difference and one of the two spectral signals.

9 Claims, 9 Drawing Sheets

DEVICE FOR PROCESSING SOUND SIGNAL, AND METHOD OF PROCESSING SOUND SIGNAL

CROSS-REFERENCE TO RELATED APPLICATION

This application is based upon and claims the benefit of priority of the prior Japanese Patent Application No. 2008-281478, filed on Oct. 31, 2008, the entire content of which is incorporated herein by reference.

FIELD

A certain aspect of the embodiments discussed herein is related generally to processing a sound signal, and in particular to processing a sound signal in a frequency domain.

BACKGROUND

A microphone array, which includes a plurality of microphones, may provide a sound source directivity of a received sound signal by processing received sound signals, to which respective received sounds are converted by the microphones.

For improving an S/N (signal-to-noise) ratio of an output sound signal, a microphone array device processes sound signals from its microphones so as to suppress undesirable noises that are contained in sounds incoming from directions other than a target sound source direction or from a suppression direction.

A known microphone array device includes an estimating unit for estimating a sound signal to be received by a virtual microphone, in a time domain based on sound signals received by a plurality of real microphones, where it is assumed that one or more virtual microphones other than the plurality of real microphones are provided. Thus, an array including a few real microphones is used to provide characteristics equivalent to those of an array of many real microphones.

A known noise eliminating device includes a frequency analyzer for computing a frequency spectrum of an input sound signal, a noise power spectrum estimating unit for estimating a noise component included in the input sound signal, a subtractor for subtracting the noise power spectrum from the input power spectrum, and a frequency synthesizer for recovering a sound signal in a time domain from a phase spectrum from the input sound signal and the power spectrum from the subtractor. The noise power spectrum estimating unit extracts, as a noise power spectrum, a power spectrum of low level powers over respective frequencies during a given period of time, so that the noise power spectrum is estimated without detecting a noise interval.

SUMMARY

According to an aspect of the embodiment, a signal processing device includes at least two sound signal input elements, an orthogonal transformer for orthogonally transforming at least two sound signals in a time domain received from two respective sound signal input elements of the at least two sound signal input elements into two respective spectral signals in a frequency domain, a phase difference determiner for determining a phase difference between the two spectral signals in the frequency domain, and a virtual spectrum generator for generating a virtual spectral signal in the frequency domain in accordance with the phase difference and at least one of the two spectral signals.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A known microphone array device, which includes a limited number of microphones, processes received sound signals in a time domain so as to define a sound suppressing direction opposite to an incoming direction of a target sound source, and delays particular samples of the received sound signals relative to other samples of the received sound signals, and subtracts the delayed samples from the other samples. This processing may sufficiently suppress a noise in the sound suppressing direction. However, it may not sufficiently suppress a background noise, such as a noise received inside a moving car or in a crowded town, in an incoming direction of the background noise, due to somewhat deviation of the background noise incoming direction from the sound suppressing direction. An increased number of the microphones may provide improved noise suppression, but may increase the cost and size of such a microphone array. A known noise estimation technique in the time domain may provide low estimation accuracy for different sound sources occurring simultaneously in respective different directions.

The inventor has recognized that a device having a limited number of sound signal input elements may be adapted to generate a virtual spectrum signal in the frequency domain of a virtual sound signal assumed to be received from a virtual sound signal input element which is different from real sound signal input elements, and process the virtual spectrum signal together with a spectrum signal in the frequency domain of a sound signal from the real sound signal input element, so that a noise in an output sound signal may be suppressed more accurately and sufficiently.

An object of an aspect of the embodiments is to generate a virtual spectrum of a virtual sound signal in accordance with sound signals from a limited number of sound signal input elements.

Another object of an aspect of the embodiments is to process sound signals from a limited number of sound signal input elements to generate a sound signal with a relatively reduced noise.

According to the aspect of the embodiments, a virtual spectrum of a virtual sound signal can be generated in accordance with sound signals from a limited number of sound signal input elements, and sound signals from a limited number of sound signal input elements can be processed to generate a sound signal with a relatively reduced noise.

Non-limiting preferred embodiments of the present invention will be described with reference to the accompanying drawings. Throughout the drawings, similar symbols and numerals indicate similar items and functions.

Figure 1:
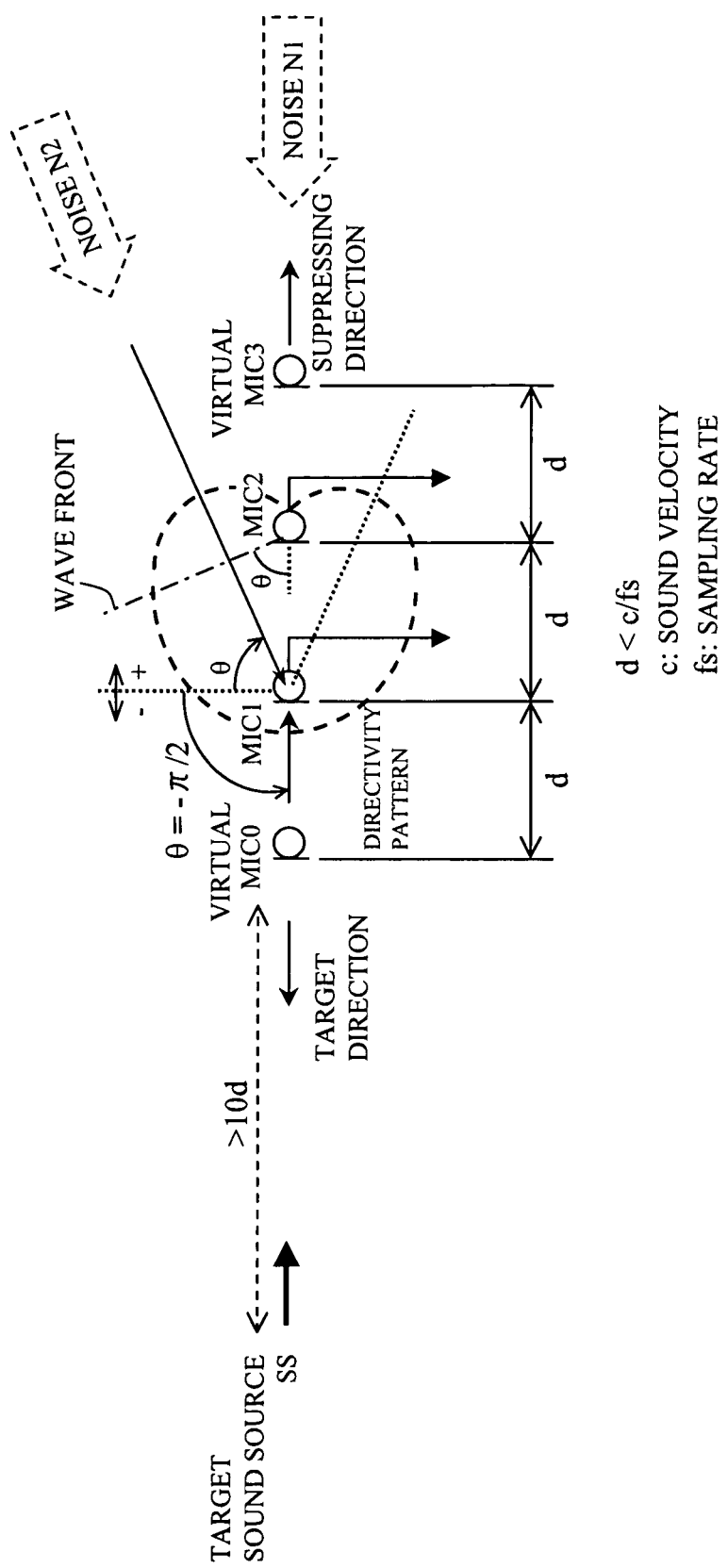
FIG. 1 illustrates an example of the arrangement of an array of real microphones and virtual microphones as sound receiving elements or sound signal input elements for use in embodiments of the present invention.

FIG. 1 illustrates an example of the arrangement of an array of real microphones MIC1 and MIC2 and virtual microphones MIC0 and MIC3 as sound receiving elements or sound signal input elements for use in embodiments of the present invention. The number of real microphones may be three or more. The number of virtual microphones may be also three or more.

Generally, the number, n, of real and virtual microphones MIC0 to MIC(n-1) in an array may be arranged substantially on a hypothetical straight line at known equal intervals or distances d between them, where the suffixes 0, 1, ..., n-1 of the reference signs "MIC" indicates order numbers of the respective microphones. As an example, four microphones MIC0 to MIC3 may be arranged on a hypothetical straight line at equal intervals or distances d between them. Alternatively, the distances d between the adjacent microphones MIC0 to MIC(n-1) need not be equal to each other. That is, as described below, the distances may be known different distances d1, d2, d3, ... such that these distances are set to satisfy the sampling theorem or the Nyquist theorem.

In order to appropriately apply the plane wave approximation, it is assumed that a target sound source SS be located at a position of more than ten times the distance d (10×d) from the array of microphones MIC0 to MIC3. In FIG. 1, it is assumed that the target sound source SS be located on the left of the microphone MIC0 on the straight line. It is assumed that the direction to the target sound source SS be defined as a sound receiving direction or a target sound source direction for the array of microphones MIC0 to MIC3. Generally, the target sound source SS may be a mouth of a human speaker, and hence the target sound source direction may be a direction approximately toward the mouth or at an angular center of an angular range covering the mouth direction. Generally, a direction opposite to the sound receiving direction, i.e. a direction of rotation by an angle $+\pi$ of the sound receiving direction, may be used as a primary noise suppressing direction, while another suppressing direction angularly deviated from the primary suppressing direction may be used as a secondary noise suppressing direction. The secondary noise suppressing direction may be determined for each frequency f of a range of sound signal frequencies f.

It is desirable that the distance d between the adjacent microphones MIC0 to MIC(n-1) satisfies the condition, $d<c/fs$, so as to satisfy the sampling theorem, where d represents the distance between the microphones, c represents a velocity of sound, and fs represents a sampling rate. In FIG. 1, the directional characteristics or the directional response pattern (e.g., a cardioid) of the array of microphones MIC0 to MIC3 is represented by a closed curve of dashed line. The real or virtual sound signals to be received from the array of microphones MIC0 to MIC3 may be processed depending on an incident angle $\theta$ (between $-\pi/2$ and $+\pi/2$) of the incoming sound relative to the straight line on which the array of microphones MIC0 to MIC3 are arranged, but independently of the radial incident direction (between 0 and $2\pi$) on a plane perpendicular to the straight line.

Only the real microphones MIC1 and MIC2 are actually provided. Then, virtual sound signals assumed to be generated by and received from the virtual microphones MIC0 and MIC3 at their respective virtual positions may be estimated or derived from the real sound signals received from the real microphones MIC1 and MIC2.

The propagating sound from the target sound source SS is detected by the right microphones MIC1 to MIC3 with a time delay $\tau=d/c$, relative to the respective left adjacent microphones MIC0 to MIC2 which are relatively closer to the target sound source SS. On the other hand, a noise N1 from the primary suppressing direction is detected with a time delay $\tau=d/c$ by the left microphones MIC0 to MIC2, relative to the respective right adjacent microphones MIC1 to MIC3 which are relatively closer to a source of the noise N1. A noise N2 from the secondary suppressing direction is detected by the left microphones MIC0 to MIC2 with a time delay $\tau=d\cdot\sin\theta/c$, relative to the respective right adjacent microphones MIC1 to MIC3 which are relatively closer to a source of the noise N2, where the angle $\theta$ represents the incoming direction of a noise N2 in the secondary suppressing direction. In FIG. 1, the dashed-dotted line represents a wave front of the incoming noise N2. The incoming direction of the noise N1 at the angle $\theta=+\pi/2$ corresponds to the direction for suppressing the sound signal.

The noise N1 from the primary suppressing direction ($\theta=+\pi/2$) can be suppressed, by subtracting each of the sound signals $IN0(t)$ to $IN2(t)$ of the left microphones MIC0 to MIC2 with a delay $\tau=d/c$, from each respective one of the sound signals $IN1(t)$ to $IN3(t)$ of the right adjacent microphones MIC1 to MIC3. However, the noise N2 incoming from an angular direction $\theta(-\pi/2\leq\theta\leq+\pi/2)$ deviated from the suppressing direction cannot be suppressed.

The inventor has recognized that the Fourier transform or orthogonal transform may be used to orthogonally transform the sound signals in the time domain from the real microphones MIC1 and MIC2 into respective complex spectra in the frequency domain, which may be further processed so as to generate a complex spectrum of a virtual sound signal in the frequency domain assumed to be generated by the virtual microphone MIC0 or MIC3 at its virtual positions. The inventor has also recognized that one of the spectra of the sound signals of adjacent two of the microphones MIC0 to MIC3 may be synchronized or aligned in phase with the other spectrum on a frequency-by-frequency basis and then a difference between the one spectrum and the other spectrum may be determined so as to sufficiently suppress a noise component incoming from a direction other than the sound source direction.

Figure 2:
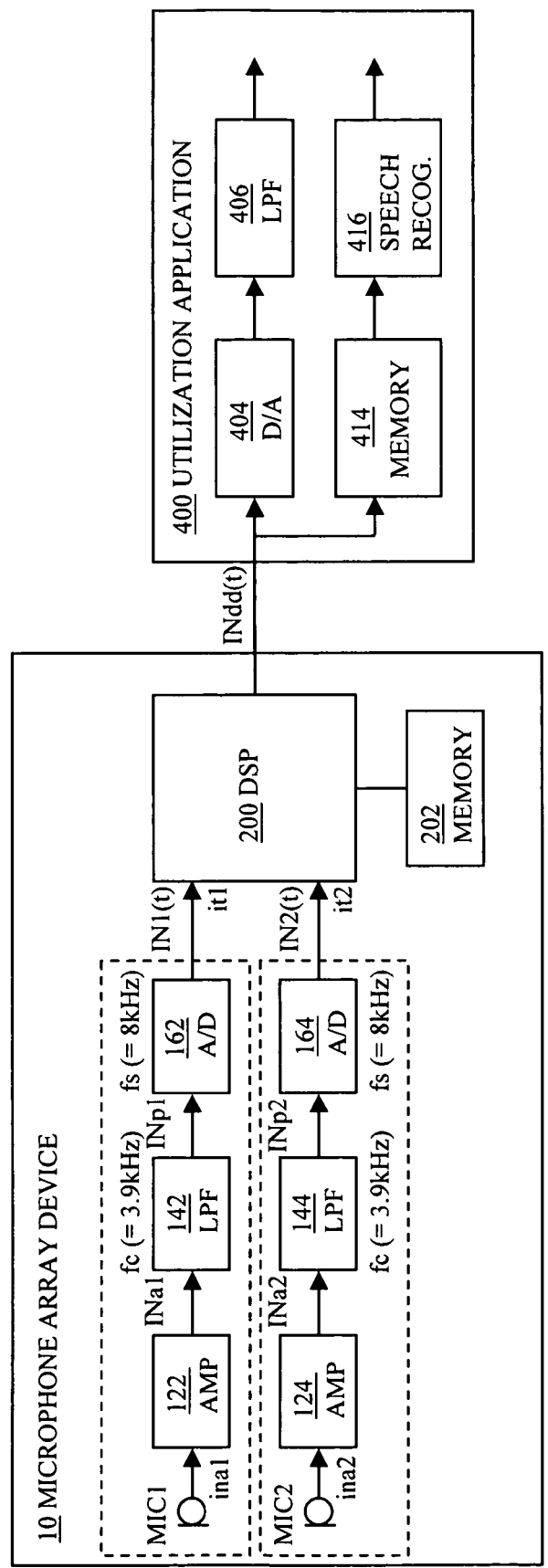
FIG. 2 illustrates an example of a schematic configuration of the microphone array device that includes the real microphones of FIG. 1, in accordance with an embodiment of the present invention.

FIG. 2 illustrates an example of a schematic configuration of the microphone array device 10 that includes the real microphones MIC1 and MIC2 of FIG. 1, in accordance with an embodiment of the present invention. The microphone array device 10 includes the microphones MIC1 and MIC2, amplifiers (AMPs) 122 and 124, low-pass filters (LPFS) 142 and 144, a digital signal processor (DSP) 200, and a memory 202. The microphone array device 10 may be an information device, such as a vehicle-mounted device or a car navigation device having a speech recognition function, or a hands-free phone or a mobile telephone.

Analog sound signals ina1 and ina2, to which respective sounds received by the respective real microphones MIC1 and MIC2 are converted, are provided to the respective amplifiers (AMPs) 122 and 124, and amplified by the amplifiers 122 and 124. The output amplified sound signals Ina1 and Ina2 from the amplifiers 122 and 124 are coupled to respective inputs of the respective low-pass filters 142 and 144 having a cut-off frequency fc (e.g., 3.9 kHz), for low-pass filtering.

The output filtered sound signals INp1 and INp2 from the low-pass filters 142 and 144 are coupled to respective inputs of respective analog-to-digital (A/D) converters 162 and 164 having a sampling rate fs (fs>2fc) (e.g., 8 kHz), and are converted into respective digital sound signals $IN1(t)$ and $IN2(t)$. The output digital sound signals $IN1(t)$ and $IN2(t)$ in the time domain from the analog-to-digital converters 162 and 164 are coupled to respective sound signal input terminals it1 and it2 of the digital signal processor 200.

The digital signal processor 200, which uses a memory 202 such as a RAM, orthogonally transforms the output digital sound signals $IN1(t)$ and $IN2(t)$ in the time domain into respective sound signals in the frequency domain. The digital signal processor 200 then processes the signals in the frequency domain by suppressing the noise N1 or N2 in the signal or enhancing the sound from the target sound source SS, and reversely and orthogonally transforms the processed signal in the frequency domain into a resultant digital sound signal INdd(t) in the time domain.

The output digital sound signal INdd(t) is used, for example, for speech recognition or for a telephone voice communication through a mobile telephone. The output digital sound signal INdd(t) is provided to a subsequent utilization application 400. Then, for example, the output digital sound signal INdd(t) is converted by a digital-to-analog (D/A) converter 404 into an analog sound signal, and the analog sound signal is then low-pass filtered by a low-pass filter 406, to thereby produce a filtered analog sound signal. Alternatively, for example, the output digital sound signal INdd(t) may be stored into a memory 414, and then used in speech recognition by a speech recognition device 416. Such a speech recognition device 416 may be implemented on a processor as hardware, or may be implemented on a processor as software operating in accordance with a program stored in the memory 414 including a ROM and a RAM for example.

The digital signal processor 200 may be a signal processing circuitry implemented as hardware. Alternatively, the function of the digital signal processor 200 may be implemented as software on the digital signal processor 200 operating in accordance with a program stored in the memory 202 including a ROM and a RAM for example.

Figures 3A, 3B:
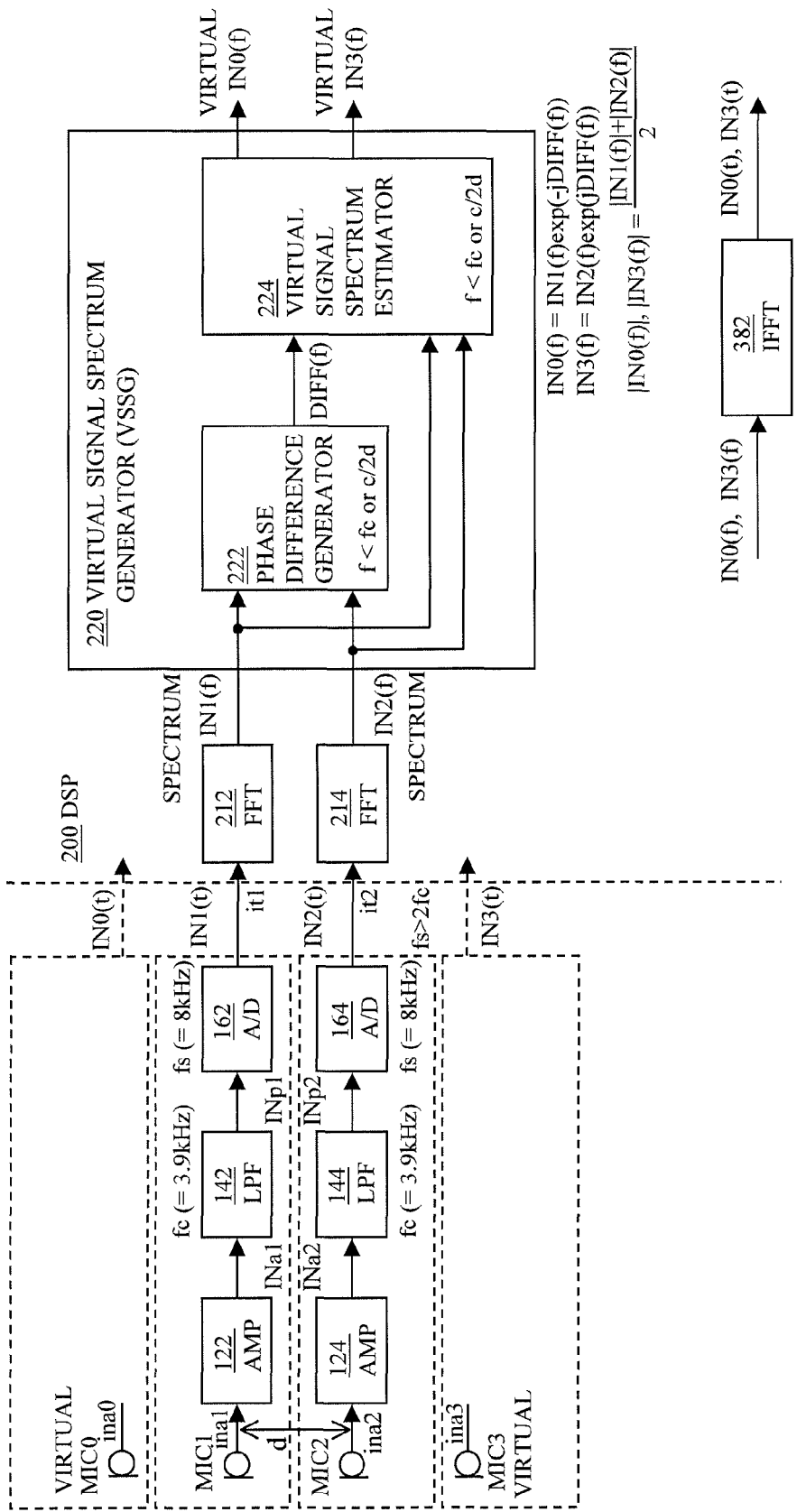
FIG. 3A illustrates an example of a schematic configuration of the digital signal processor of FIG. 2, which processes the digital sound signals in the time domain to thereby generate virtual complex spectra in the frequency domain of the virtual sound signals of the virtual microphones of FIG. 1.
FIG. 3B illustrates an example of an optional additional element for the digital signal processor that allows the virtual sound signals in the time domain of the virtual microphones to be actually generated in accordance with the virtual complex spectra in the frequency domain.

FIG. 3A illustrates an example of a schematic configuration of the digital signal processor (DSP) 200 of FIG. 2, which processes the converted digital sound signals in the time domain derived from the analog sound signals from the real microphones MIC1 and MIC2 of FIG. 1, to thereby generate virtual complex spectra in the frequency domain of the virtual sound signals of the virtual microphones MIC0 and MIC3 of FIG. 1.

The digital signal processor 200 includes fast Fourier transformers (FFTs) 212 and 214 which have respective inputs coupled to respective outputs of the analog-to-digital converters 162 and 164, and a virtual signal spectrum generator unit (VSSG) 220. The virtual signal spectrum generator unit 220 includes a phase difference generator unit 222 for generating a phase difference between respective complex spectral components at each frequency f, and includes a virtual signal spectrum estimator unit 224 for generating a complex spectrum in the frequency domain of a virtual sound signal. In this embodiment, the fast Fourier transform is used for orthogonally transforming the digital sound signals from the time domain into the frequency domain. Alternatively, another transform function such as the discrete cosine transform, the wavelet transform, or the like, may be employed for the orthogonal transform.

A group of the elements MIC1, 122, 142 and 162 which produces the digital sound signal $IN0(t)$ may be considered as a real microphone unit for the microphone MIC1. A group of the elements MIC2, 124, 144 and 164 which produces the digital sound signal $IN1(t)$ may be considered as a real microphone unit for the microphone MIC1. A virtual microphone unit which produces a digital sound signal $IN0(t)$ may be assumed for the virtual microphone MIC0. Similarly, a virtual microphone unit which produces a digital sound signal $IN3(t)$ may be assumed for the virtual microphone MIC3. In FIG. 3A, each of the real and virtual microphone units is indicated as being enclosed by a dashed line square.

The digital sound signals $IN1(t)$ and $IN2(t)$ in the time domain from the analog-to-digital converters 162 and 164 are provided to the respective inputs of the respective fast Fourier transformers (FFTs) 212 and 214. The fast Fourier transformer 212 multiplies the digital sound signal in each interval of a sequence of signal intervals of the digital sound signal $IN1(t)$ by an overlapped window function, to thereby produce a sequence of resultant products, in a known manner. Similarly, the fast Fourier transformer 214 multiplies the digital sound signal in each interval of a sequence of signal intervals of the respective digital sound signal $IN2(t)$ by the overlapped window function, to thereby produce a sequence of resultant products. Each of the fast Fourier transformers 212 and 214 then performs Fourier transform on each of the respective sequences of resultant products to generate a corresponding sequence of a complex sound spectrum $IN1(f)$ or $IN2(f)$ in the frequency domain, in a known manner. The complex spectra $IN1(f)$ and $IN2(f)$ may be represented as $IN1(f) = A_1 e^{j(2\pi ft + \phi 1(f))}$, and $IN2(f) = A_2 e^{j(2\pi ft + \phi 2(f))}$, where f represents a component sound frequency, $A_1$ and $A_2$ represent respective amplitudes, j represents the imaginary unit, and $\phi 1(f)$ and $\phi 2(f)$ represent respective delayed phases as functions of the frequency f. The overlapped window function may be the Hamming window function, the Hanning window function, the Blackman window function, or the three-sigma Gaussian window function, for example.

The phase difference generator unit 222 determines or computes a phase difference DIFF(f) (rad) between the phase spectral components, in accordance with the following complex formula, where the phase difference is considered to indicate a direction of a sound source at each sound frequency f, at the positions of the two respective adjacent microphones MIC1 and MIC2 separated by a distance d.

$$DIFF(f) = \tan^{-1}(IN2(f)/IN1(f))$$
$$= \tan^{-1}((A_2 e^{j(2\pi ft + \phi 2(f))}/A_1 e^{j(2\pi ft + \phi 1(f))})$$
$$= \tan^{-1}((A_2/A_1)e^{j(\phi 2 - \phi 1)})$$
$$= \tan^{-1}(\sin(\phi 2 - \phi 1)/\cos(\phi 2 - \phi 1))$$
$$= \phi 2 - \phi 1,$$

where it is assumed as an approximation that a noise at a particular sound frequency f is generated by a single or weighted center sound source alone. Further, if it can be assumed that the amplitudes $A_1$ and $A_2$ of the respective sound signals of the respective microphones MIC1 and MIC2 are approximately equal to each other ($|IN1(f)|=|IN2(f)|$), then a value of the fraction $A_2/A_1$ may be approximated to be one (1).

The phase difference generator unit 222 provides, to the virtual signal spectrum estimator unit 224, the value of the phase difference DIFF(f) between the two phase spectral components at each frequency f of the two respective adjacent complex sound spectral signals IN1(f) and IN2(f).

The virtual signal spectrum estimator unit 224 estimates that a virtual noise assumed to be received by the virtual microphone MIC0 at its virtual position and in the direction $\theta(-\pi/2 \leq \theta \leq +\pi/2)$ other than the target sound source direction and to appear in the virtual sound signal at a particular sound frequency f to be generated by the virtual microphone MIC0 may be defined as the noise in the sound signal of the microphone MIC1 arriving at the virtual microphone MIC0 at its virtual position with a time delay by the phase difference DIFF(f). The virtual signal spectrum estimator unit 224 also estimates that a virtual noise assumed to be received by the virtual microphone MIC3 at its virtual position and in the direction $\theta(-\pi/2 \leq \theta \leq +\pi/2)$ and to appear in the virtual sound signal at a particular sound frequency f to be generated by the virtual microphone MIC3 may be defined as the noise in the sound signal of the microphone MIC2 having arrived at the virtual microphone MIC3 at its virtual position with a time advance by the phase difference DIFF(f).

Thus, the virtual signal spectrum estimator unit 224 determines or computes virtual complex spectra IN0(f) and IN3(f) in the frequency domain of the respective digital virtual sound signals IN0(t) and IN3(t) assumed to be received from the respective virtual microphones MIC0 and MIC3 at their respective virtual positions, where it is assumed that the virtual microphones MIC0 and MIC3 are located at different or opposite outward positions at a distance d from the respective real microphones MIC1 and MIC2 on a straight line that runs through the positions of the microphones MIC1 and MIC2.

The virtual complex spectrum IN0(f) in the frequency domain of the virtual sound signal IN0(t) assumed to be received from the virtual microphone MIC0 (n=0<1) at its virtual position is expressed by the following complex formula which uses, as a reference, the nearest real microphone MIC1 for the spectral component at each frequency f.

$$IN0(f)=IN1(f) \cdot \exp(-j \, DIFF(f))$$

Alternatively, the virtual complex spectrum IN0(f) may be expressed by the following complex formula.

$$IN0(f)=IN1'(f) \cdot \exp(-j \, DIFF(f)),$$

where the amplitude of IN1'(f) is the average of the amplitudes of the complex spectra IN1(f) and IN2(f), i.e., $$|IN1'(f)|=(|IN1(f)|+|IN2(f)|)/2.$$

The virtual complex spectrum IN0(f) may be also expressed by the following complex formula.

$$IN0(f)=IN1(f) \times \{(|IN1(f)|+|IN2(f)|)/2|IN1(f)|\} \times \exp(-j \, DIFF(f)).$$

In FIG. 1, if the virtual microphone MIC0 is assumed to be located at a different position shifted left from the microphone MIC1 by a distance d'($\neq$d), the phase difference DIFF(f) may be replaced by DIFF(f)×(d'/d) in the formula given above.

On the other hand, the virtual complex spectrum IN3(f) in the frequency domain of the virtual sound signal IN3(t) assumed to be received from the virtual microphone MIC3 (n=3>2) at its virtual position is expressed by the following complex formula which uses, as a reference, the nearest real microphone MIC2 for the spectral component at each frequency f.

$$IN3(f)=IN2(f) \cdot \exp(j \, DIFF(f))$$

Alternatively, the virtual complex spectrum IN3(f) may be expressed by the following complex formula.

$$IN3(f)=IN2'(f) \cdot \exp(j \, DIFF(f)),$$

where the amplitude of IN2'(f) is the average of the amplitudes of the complex spectra IN1(f) and IN2(f), i.e., $$|IN2'(f)|=(|IN1(f)|+|IN2(f)|)/2.$$

The virtual complex spectrum IN3(f) may be also expressed by the following complex formula.

$$IN3(f)=IN2(f) \times \{(|IN1(f)|+|IN2(f)|)/2|IN2(f)|\} \times \exp(j \, DIFF(f)).$$

In FIG. 1, if the virtual microphone MIC3 is assumed to be located at a different position shifted right from the microphone MIC2 by a distance d'($\neq$d), the phase difference DIFF(f) may be replaced by DIFF(f)×(d'/d) in the formula given above.

Thus, the virtual signal spectrum estimator unit 224 generates estimated virtual complex spectra IN0(f) and IN3(f) in the frequency domain of the virtual sound signals IN0(t) and IN3(t) assumed to be received from the virtual microphones MIC0 and MIC3 at their virtual positions. The virtual signal spectrum estimator unit 224 may generate any one or both of the virtual complex spectra IN0(f) and IN3(f).

The determination of the estimated virtual complex spectrum IN0(f) or IN3(f) for the virtual microphone MIC0 or MIC3 as described above may be generalized to determination of an estimated virtual complex spectrum for an arbitrary virtual microphone MICn, as described below.

The virtual complex spectrum INn(f) for the virtual microphone MICn arranged at an integral multiple of a distance d from the real microphone MIC1 or MIC2 is obtained by the following complex formula for the spectral component at each frequency f, where n indicates an integer satisfying n<1 or n>2) in the frequency domain of the virtual sound signal assumed to be received by the virtual microphone MICn (n=0, -1, -2, ..., or n=3, 4, 5, ...) at its virtual position.

For n<1, using as a reference the complex spectrum IN1(f) of the microphone MIC1, $$INn(f)=IN1(f) \cdot \exp(-j(1-n)DIFF(f)).$$

For n>2, using as a reference the complex spectrum IN2(f) of the microphone MIC2, $$INn(f)=IN2(f) \cdot \exp(j(n-2)DIFF(f)).$$

The virtual signal spectrum estimator unit 224 may generate estimated virtual complex spectra INn(f) in the frequency domain of the virtual sound signals INn(t) assumed to be received from the virtual microphones MICn (n=−1, −2, −3, . . . ; n=4, 5, 6, . . . ) at their virtual positions.

FIG. 3B illustrates an example of an optional, additional element in the digital signal processor 200 for actually generating the virtual sound signals IN0(*t*) and IN3(*t*) in the time domain assumed to be received from the virtual microphones MIC0 and MIC3, in accordance with the virtual complex spectra IN0(*f*) and IN3(*f*) in the frequency domain.

The digital signal processor 200 further includes an inverse fast Fourier transformer (IFFT) 382. The inverse fast Fourier transformer 382 receives the virtual spectrum IN0(*f*) or IN3(*f*) from the virtual signal spectrum estimator unit 224, and then performs inverse Fourier transform on the received virtual complex spectrum according to the overlapped-add method, to generate a virtual sound signal IN0(*t*) or IN3(*t*) in the time domain assumed to be received from the virtual microphone MIC0 or MIC3 at its virtual position.

Thus, for example, the virtual sound signal IN0(*t*) or IN3(*t*) in the time domain can be observed using a measurement device or the like. The digital virtual sound signal IN0(*t*) or IN3(*t*) may be further processed by a digital-to-analog converter and filtered by a low-pass filter, to thereby produce a sound of the virtual sound signal, which may be emitted by a speaker to be heard.

Figure 4A:
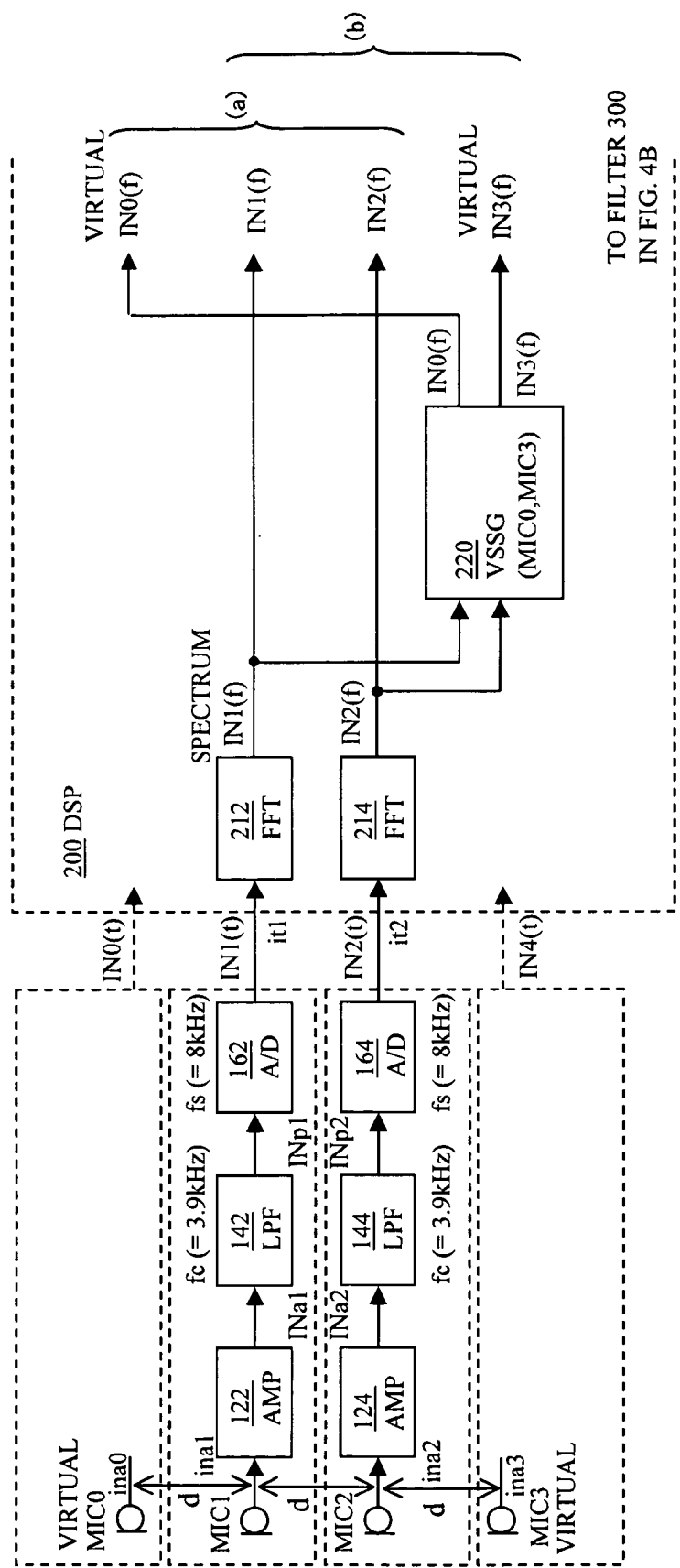
FIGS. 4A and 4B illustrate an example of a schematic configuration of a microphone array device with the array of microphones as arranged in FIG. 1, which includes the virtual signal spectrum generator unit (VSSG) of FIG. 3A, and may relatively reduce a noise.
Figure 4B:
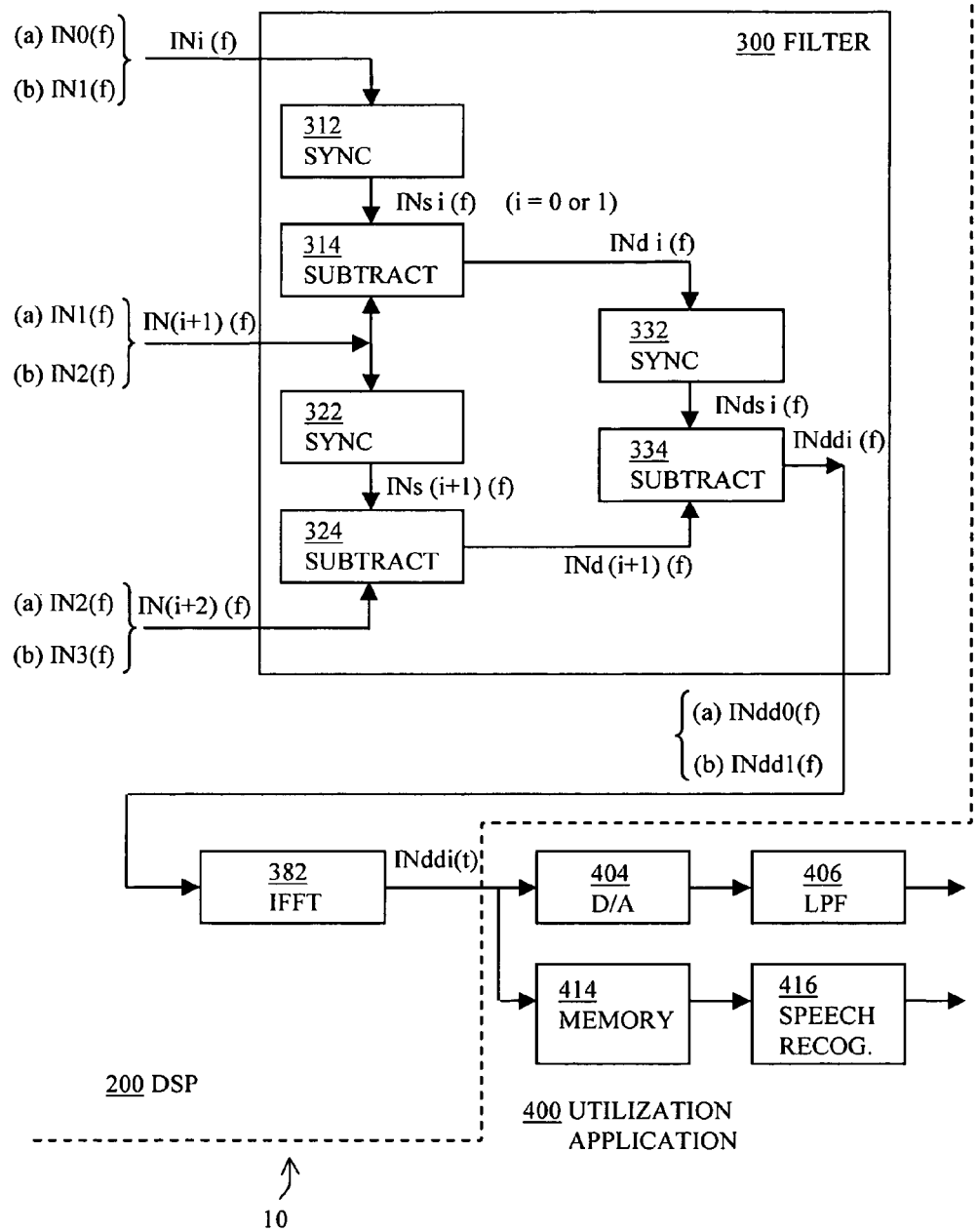

FIGS. 4A and 4B illustrate an example of a schematic configuration of the microphone array device 10 with the array of microphones MIC0 to MIC3 as arranged in FIG. 1. The microphone array device 10 of FIGS. 4A and 4B includes the virtual signal spectrum generator unit (VSSG) 220 of FIG. 3A, and may relatively reduce a noise by means of noise suppression or target sound signal enhancement or emphasis.

The elements 122 to 164 and 212 to 220 of FIG. 4A are similar to those of FIG. 3A. In the microphone array device 10 of FIGS. 4A and 4B, the digital signal processor 200 includes the fast Fourier transformers (FFTs) 212 and 214, a virtual signal spectrum generator unit 220, a filter unit 300 for filtering complex spectra, i.e., power spectra and phase spectra, in the frequency domain, and an inverse fast Fourier transformer (IFFT) 382. The output of the inverse fast Fourier transformer 382 is coupled to the input of a utilization application 400 provided as a subsequent element.

The filter unit 300 includes synchronizer units 312, 322 and 332, and subtractors 314, 324 and 334 as combiners.

The digital signal processor 200 uses, for the noise suppression or target sound signal enhancement, either (a) a spectrum combination of the complex spectra IN0(*f*), IN1(*f*) and IN2(*f*), or (b) a spectrum combination of the complex spectra IN1(*f*), IN2(*f*) and IN3(*f*). Alternatively, the digital signal processor 200 may use a spectrum combination of four or more complex spectra, such as the complex spectra IN0(*f*), IN1(*f*), IN2(*f*) and IN3(*f*), although the number of stages of synchronization and combining (subtraction or addition) and hence the signal processing load may increase.

For each of the spectrum combinations (a) and (b), the fast Fourier transformers 212 and 214 provide the complex spectra IN1(*f*) and IN2(*f*) to the filter unit 300 of FIG. 4B. For the spectrum combination (a), the virtual signal spectrum generator unit 220 further provides the virtual complex spectrum IN0(*f*) to the filter unit 300. Alternatively, for the combination (b), the virtual signal spectrum generator unit 220 further provides the virtual complex spectrum IN3(*f*) to the filter unit 300.

In FIG. 4B, for the spectrum combination (a), the suffix parameter i=0 is set to the filter unit 300. For the combination (b), the suffix parameter i=1 is set to the filter unit 300.

In the filter unit 300, the synchronizer unit 312 synchronizes the complex spectrum INi(f) with the complex spectrum IN(i+1)(f) to generate a complex spectrum INsi(f), in accordance with a particular phase difference as described below. The subtractor 314 subtracts the complex spectrum IN(i+1)(f) from the synchronized complex spectrum INsi(f), to thereby generate a difference complex spectrum INdi(f). Accordingly, a noise spectral component derived or originating from a noise N1 in the primary suppressing direction that is really or virtually received by the microphone MICi at its position may be suppressed in the difference complex spectrum INdi(f).

On the other hand, the synchronizer unit 322 synchronizes the complex spectrum IN(i+1)(f) with the complex spectrum IN(i+2)(f) to generate a synchronized complex spectrum INs(i+1)(f), in accordance with the particular phase difference as described below. The subtractor 324 subtracts the complex spectrum IN(i+2)(f) from the synchronized complex spectrum INs(i+1)(f), to thereby generate a difference complex spectrum INd(i+1)(f). Accordingly, a noise spectral component derived or originating from a noise N1 in the primary suppressing direction that is received by the microphone MIC (i+1) at its position may be suppressed in the difference complex spectrum INd(i+1)(f) in the difference complex spectrum INd(i+1)(f).

Further, the synchronizer unit 332 synchronizes the complex spectrum INdi(f) with the complex spectrum INd(i+1)(f) to generate a synchronized complex spectrum INdsi(f), in accordance with a particular phase difference as described below. The subtractor 334 subtracts the complex spectrum INd(i+1)(f) from the synchronized complex spectrum INdsi (f), to thereby generate a difference complex spectrum INddi (f). Accordingly, a noise spectral component derived or originating from a noise N2 in the secondary suppressing direction that is really or virtually received by the microphone MICi at its position may be suppressed in the difference complex spectrum INddi(f).

Thus, with the spectrum combination (a) for i=0, the synchronizer unit 312 synchronizes the virtual complex spectrum IN0(*f*) with the complex spectrum IN1(*f*) to generate a synchronized virtual complex spectrum INs0(*f*). Then, the subtractor 314 subtracts the complex spectrum IN1(*f*) from the synchronized virtual complex spectrum INs0(*f*), to thereby generate a virtual difference complex spectrum INd0 (*f*). Thus, a noise component originating from a noise N1 in the primary suppressing direction that is virtually received by the virtual microphone MIC0 at its position may be suppressed.

The synchronizer unit 322 synchronizes the complex spectrum IN1(*f*) with the complex spectrum IN2(*f*) to generate a synchronized complex spectrum INs1(*f*). The subtractor 324 subtracts the complex spectrum IN2(*f*) from the synchronized complex spectrum INs1(*f*), to thereby generate a difference complex spectrum INd1(*f*). Thus, a noise component originating from a noise N1 in the primary suppressing direction that is received by the microphone MIC1 at its position may be suppressed.

Further, the synchronizer unit 332 synchronizes the virtual complex spectrum INd0(*f*) with the complex spectrum INd1 (*f*) to generate a synchronized virtual complex spectrum INds0(*f*). The subtractor 334 subtracts the complex spectrum INd1(*f*) from the synchronized virtual complex spectrum INds0(*f*), to thereby generate a difference virtual complex spectrum INdd0(*f*). Thus, a noise component originating from a noise N2 in the secondary suppressing direction that is virtually received by the microphone MIC0 at its position may be suppressed.

On the other hand, in the spectrum combination (b) for i=1, the synchronizer unit 312 synchronizes the complex spectrum IN1(f) with the complex spectrum IN2(f) to generate a synchronized complex spectrum INs1(f). Then, the subtractor 314 subtracts the complex spectrum IN2(f) from the synchronized complex spectrum INs1(f), to thereby generate a difference complex spectrum INd1(f). Thus, a noise component originating from a noise N1 in the primary suppressing direction that is received by the microphone MIC1 at its position may be suppressed.

The synchronizer unit 322 synchronizes the complex spectrum IN2(f) with the virtual complex spectrum IN3(f) to generate a synchronized complex spectrum INs2(f). The subtractor 324 subtracts the virtual complex spectrum IN3(f) from the synchronized complex spectrum INs2(f), to thereby generate a difference complex spectrum INd2(f). Thus, a noise component originating from a noise N1 in the primary suppressing direction that is received by the microphone MIC2 at its position may be suppressed.

Further, the synchronizer unit 332 synchronizes the complex spectrum INd1(f) with the complex spectrum INd2(f) to generate a synchronized complex spectrum INds1(f). The subtractor 334 subtracts the complex spectrum INd2(f) from the synchronized complex spectrum INds1(f), to thereby generate a difference complex spectrum INdd1(f). Thus, a noise component originating from a noise N2 in the secondary suppressing direction that is received by the microphone MIC1 at its position may be suppressed.

Each of the synchronizer units 312, 322 and 332 multiplies the input complex spectrum INi(f), IN(i+1)(f) or INdi(f) by a leading or advanced phase $\exp(-j\, 2\pi f \times \theta/(\pi \times fs/2))$ to shift the phase of the input complex spectrum for synchronization, where the angle $\theta$ indicates the incident angular direction $\theta$ of a noise component at the frequency f to be suppressed in FIG. 1. For example, the angle $\theta$ may be determined to be an angle $+\pi/2$ in the primary suppressing direction, and an angle $+\pi/4$ in the secondary suppressing direction. For the distance $d' \neq d$, the phase difference is multiplied by a factor of $d'/d$.

For the purpose of explanation, it is assumed that the distance d between adjacent microphones among the real and virtual microphones MIC0, MIC1, MIC2 and MIC3 is not smaller than the quotient c/fs (d≥c/fs), i.e. the condition of d<c/fs is not satisfied, where d represents a distance, c represents a velocity of sound, and fs represents a sampling rate. In this case, the virtual signal spectrum generator unit 220 or the phase difference generator unit 222 of the virtual signal spectrum generator unit 220 may generate the virtual complex spectral component IN0(f) and/or IN3(f) only for the lower frequencies f (i.e., f<c/2d) than the critical frequency f=c/2d, within a frequency range that satisfies the condition of d<c/2fc and fs>2fc, where d indicates a distance, c indicates a velocity of sound, 2fc indicates twice an upper limit or cutoff frequency of a frequency band of the low-pass filters 142 and 144, and fs represents a sampling rate.

The filter unit 300 combines the complex spectra IN1(f) and IN2(f)(f<fc) with the complex spectra IN0(f) and/or IN3 (f)(f<c/2d) within the particular frequency range (f<fc). When the condition d≥c/fs is satisfied, i.e. the condition of d<c/fs is not satisfied, the filter unit 300 does not process the complex spectra for the frequency f in the higher frequency range c/2d<f<fc.

The filter unit 300 (the subtractor 334) provides the generated complex spectrum INddi(f) to the inverse fast Fourier transformer 382. The inverse fast Fourier transformer 382 multiplies the spectral component INddi(f) in the frequency domain by the overlapped inverse window function (e.g., inverse Hamming window), according to the overlapped-add method, to perform inverse fast Fourier transform on the product into a digital sound signal INddi(t) in the time domain in the particular frequency range (f<fc). Then, the inversely transformed digital sound signal INddi(t) is provided to a utilization application 400 similar to that of FIG. 2.

Figure 5:
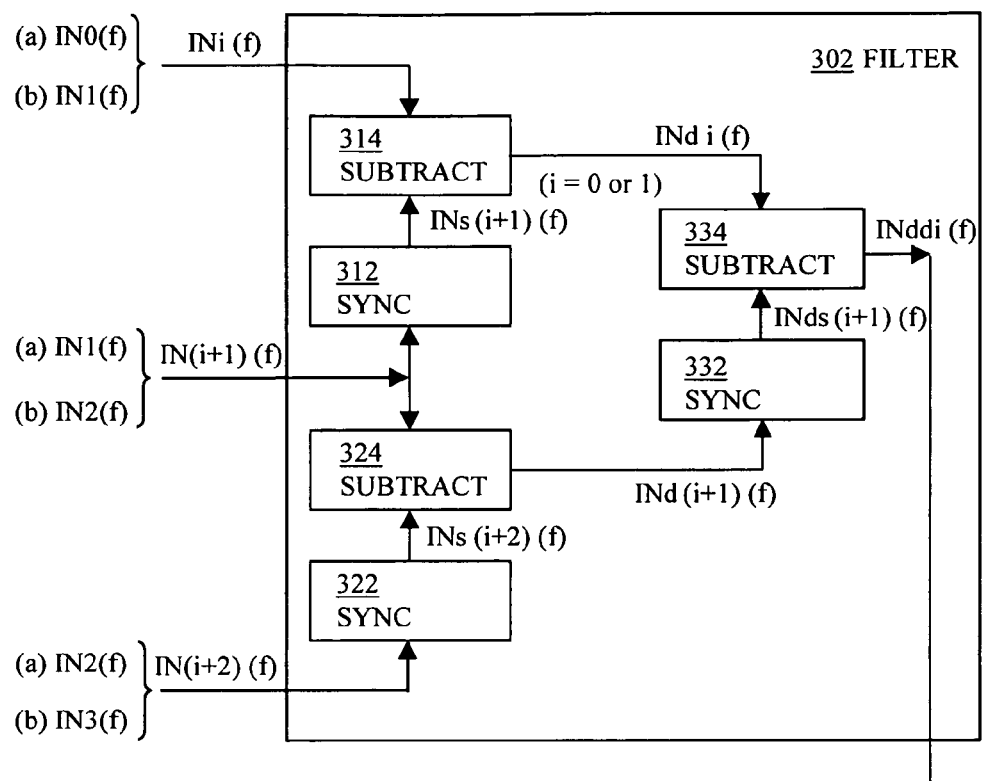
FIG. 5 illustrates an example of a schematic configuration of a filter unit as a modification of and an alternative to the filter unit of FIG. 4B.

FIG. 5 illustrates an example of a schematic configuration of a filter unit 302 as a modification of and an alternative to the filter unit 300 of FIG. 4B.

In the filter 302, the synchronizer unit 312 synchronizes the complex spectrum IN(i+1)(f) with the complex spectrum INi (f) to generate a synchronized complex spectrum INs(i+1)(f). The subtractor 314 subtracts the synchronized complex spectrum INs(i+1)(f) from the complex spectrum INi(f), to thereby generate a difference complex spectrum INdi(f).

The synchronizer unit 322 synchronizes the complex spectrum IN(i+2)(f) with the complex spectrum IN(i+1)(f) to generate a synchronized complex spectrum INs(i+2)(f). The subtractor 324 subtracts the synchronized virtual complex spectrum INs(i+2)(f) from the complex spectrum IN(i+1)(f), to thereby generate a difference complex spectrum INd(i+1) (f).

Further, the synchronizer unit 332 synchronizes the complex spectrum INd(i+1)(f) with the complex spectrum INdi(f) to generate a synchronized complex spectrum INds(i+1)(f). The subtractor 334 subtracts the synchronized complex spectrum INds(i+1)(f) from the complex spectrum INdi(f), to thereby generate a difference complex spectrum INddi(f).

Each of the synchronizer units 302, 312 and 322 multiplies the input complex spectrum IN(i+1)(f), IN(i+2)(f) or INd(i+1) by a delayed phase $\exp(j\, 2\pi f \times \theta/(\pi \times fs/2))$ to shift the phase of the input complex spectrum for synchronization, where the angle $\theta$ indicates the incident angular direction $\theta$ of a noise component at the frequency f to be suppressed in FIG. 1. For the distance $d' \neq d$, the phase difference is multiplied by a factor of $d'/d$.

Alternatively, the filtering for noise suppression may also be performed in the time domain, using the virtual sound signals IN0(t) and/or IN3(t) in the time domain of FIG. 3B assumed to be received from the virtual microphones MIC0 and MIC3 at their positions.

As an example, the sound signal IN1(t) in the time domain received from the microphone MIC1 of FIG. 2 at its position may be delayed by a phase difference $\tau$, relative to the virtual sound signal IN0(t) in the time domain assumed to be received from the virtual microphone MIC0 of FIG. 3B at its virtual position, to thereby generate a delayed sound signal IN1(t+$\tau$). The phase difference $\tau$ may be a particular phase difference, or $\tau$=DIFF(f). Then, the delayed sound signal IN1(t+$\tau$) may be subtracted from the virtual sound signal IN0(t) in the time domain, to thereby generate a sound signal INd0(t) with the noise suppressed.

The virtual sound signal IN2(t) in the time domain received from the microphone MIC2 at its position may be delayed by a phase difference $\tau$, relative to the sound signal IN1(t) in the time domain received from the microphone MIC1 of FIG. 2 at its position, to thereby generate a delayed sound signal IN2 (t+$\tau$). Then, the delayed sound signal IN2(t+$\tau$) may be subtracted from the sound signal IN1(t) in the time domain to thereby generate a sound signal INd1(t) with the noise suppressed.

Further, the sound signal INd1(t) in the time domain can be delayed by a phase difference $\tau$, relative to the sound signal INd0(t) in the time domain, to thereby generate a delayed sound signal INd0(t+$\tau$). The phase difference may be $\tau$=DIFF (f). The phase difference $\tau$ may be a particular phase difference, or $\tau$=DIFF(f). Then, the delayed sound signal INd1(t+$\tau$) may be subtracted from the virtual sound signal INd0(t) in the time domain, to thereby generate a virtual sound signal INdd0

(t) with the noise further suppressed. In this case, however, the processing load of the inverse fast Fourier transform may increase.

As another example, the virtual sound signal IN3(t) in the time domain assumed to be received from the virtual microphone MIC3 of FIG. 3B at its virtual position may be delayed by a phase difference τ, relative to the sound signal IN2(t) in the time domain received from the virtual microphone MIC2 of FIG. 2 at its position, to thereby generate a delayed sound signal IN3(t+τ). Then, the delayed virtual sound signal IN3 (t+τ) may be subtracted from the sound signal IN2(t) in the time domain, to thereby generate a sound signal INd2(t) with the noise suppressed.

Further, the above-mentioned sound signal INd2(t) in the time domain may be delayed by a phase difference τ, relative to the sound signal INd1(t) in the time domain, to thereby generate a delayed sound signal INd2(t+τ). Then, the delayed sound signal INd2(t+τ) may be subtracted from the sound signal INd1(t) in the time domain, to thereby generate a sound signal INdd1(t) with the noise further suppressed.

Alternatively, in FIG. 4A, one of the microphones MIC0 and MIC3 may be a real microphone, while the other may be a virtual microphone. That is, the one of the microphones MIC0 and MIC3 may be coupled to an amplifier, a low-pass filter, a D/A converter, and a fast Fourier transformer, similar to the elements 122 to 214 for the microphone MIC1 or MIC2, and also coupled to the filter unit 300. In this case, both of the difference complex spectra INdd0(f) and INdd1(f) in the frequency domain may be generated. For suppression of a noise in a third suppressing direction, one of the complex spectra INdd0(f) and INdd1(f) may be synchronized with the other. Then, the synchronized complex spectrum may be subtracted from or combined with the other complex spectrum, to thereby generate a further combined complex spectrum INddd0(f) with the noise further suppressed.

Figure 6:
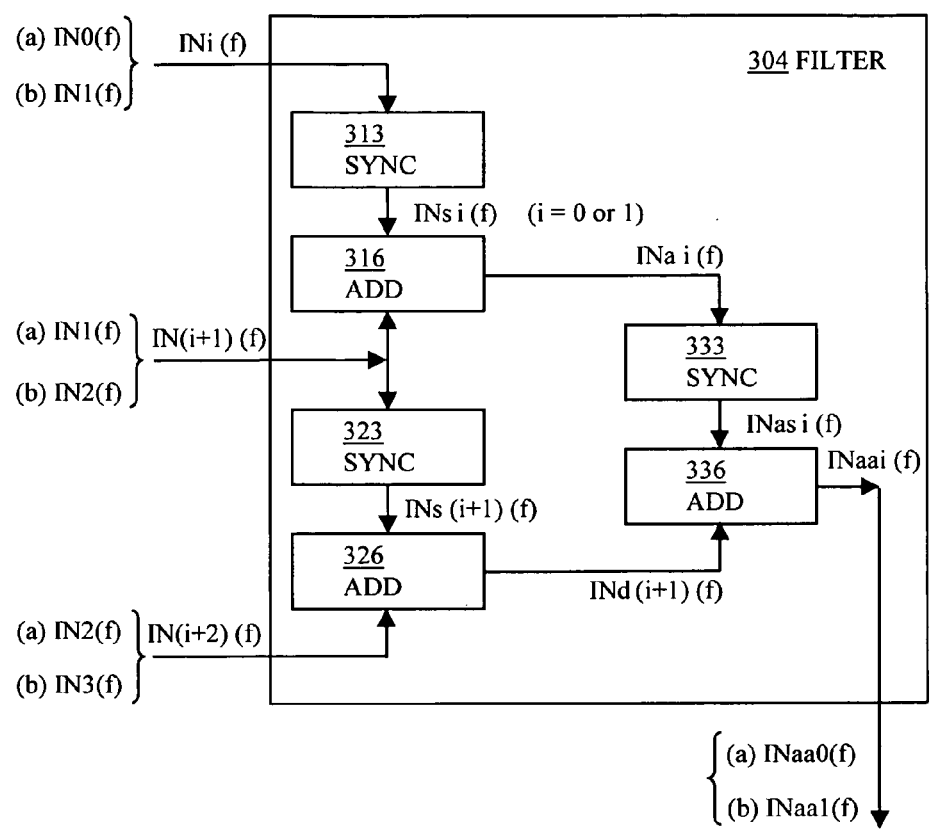
FIG. 6 illustrates an example of a schematic configuration of a filter unit for the target sound signal enhancement as a modification of the filter unit of FIG. 4B.

FIG. 6 illustrates an example of a schematic configuration of a filter unit 304 for the target sound signal enhancement as a modification of the filter unit 300 of FIG. 4B.

The filter unit 304 includes synchronizer units 313, 323, and 333, and adders 316, 326, and 336 as combiners.

The synchronizer unit 313 synchronizes the complex spectrum INi(f) with the complex spectrum IN(i+1)(f) to generate a synchronized complex spectrum INsi(f). The adder 316 adds the complex spectrum IN(i+1)(f) to the synchronized complex spectrum INsi(f), to thereby generate a sum complex spectrum INai(f). Thus, the target sound spectral component derived or originating from the target sound source SS received by the microphone MICi in its position may be enhanced in the sum complex spectrum INai(f).

The synchronizer unit 323 synchronizes the complex spectrum IN(i+1)(f) with the complex spectrum IN(i+2)(f) to generate a synchronized complex spectrum INs(i+1)(f). The adder 326 adds the complex spectrum IN(i+2)(f) to the synchronized complex spectrum INs(i+1)(f), to thereby generate a sum complex spectrum INa(i+1)(f). Thus, the target sound spectral component derived or originating from the target sound source SS received by the derived or microphone MIC (i+1) in its position may be enhanced in the sum complex spectrum INa(i+1)(f).

Further, the synchronizer unit 333 synchronizes the complex spectrum INai(f) with the complex spectrum INa(i+1)(f) to generate a synchronized complex spectrum INasi(f). The adder 336 adds the complex spectrum INa(i+1)(f) to the synchronized complex spectrum INasi(f), to thereby generate a sum complex spectrum INaai(f). Thus, the target sound spectral component derived or originating from the target sound source SS received by the microphone MICi in its position may be enhanced in the sum complex spectrum INaai(f).

Each of the synchronizer units 313, 323 and 333 multiplies the input complex spectrum INi(f), IN(i+1)(f) or INai(f) by a delayed phase exp(j 2πfxθ/(π×fs/2)) to shift the phase of the input complex spectrum for synchronization, where the angle θ indicates the angular direction θ=−π/2 of the target sound spectral component at the frequency f to be enhanced, originating from the target sound source SS in FIG. 1.

Figure 7:
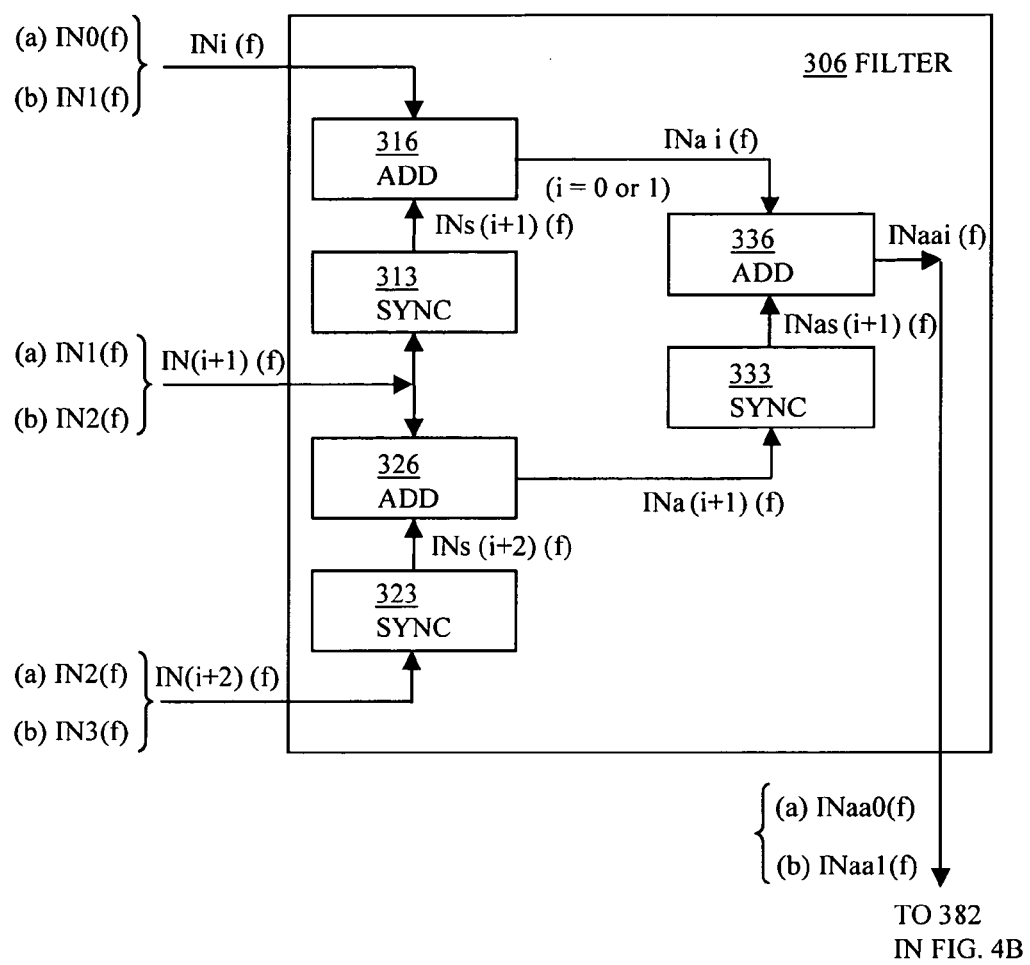
FIG. 7 illustrates an example of a schematic configuration of a filter unit for the target sound signal enhancement as a modification of the filter unit of FIG. 5 or the filter unit of FIG. 6.

FIG. 7 illustrates an example of a schematic configuration of a filter unit 306 for the target sound signal enhancement as a modification of the filter unit 302 of FIG. 5 or the filter unit 304 of FIG. 6.

The synchronizer unit 313 synchronizes the complex spectrum IN(i+1)(f) with the complex spectrum INi(f) to generate a synchronized complex spectrum INs(i+1)(f). The adder 316 adds the synchronized complex spectrum INs(i+1)(f) to the complex spectrum INi(f), to thereby generate a sum complex spectrum INai(f)

The synchronizer unit 323 synchronizes the complex spectrum IN(i+2)(f) with the virtual complex spectrum IN(i+1)(f) to generate a synchronized complex spectrum INs(i+2)(f). The adder 326 adds the synchronized complex spectrum INs (i+2)(f) to the complex spectrum IN(i+1)(f), to thereby generate a sum complex spectrum INa(i+1)(f).

The synchronizer unit 333 synchronizes the complex spectrum INa(i+1)(f) with the complex spectrum INai(f) to generate a synchronized complex spectrum INas(i+1)(f). The adder 336 adds the synchronized complex spectrum INas(i+1)(f) to the complex spectrum INai(f), to thereby generate a sum complex spectrum INaai(f).

Each of the synchronizer units 313, 323 and 333 multiplies the input complex spectrum IN(i+1)(f), IN(i+2)(f) or INa(i+1)(f) by a leading phase exp(−j 2πfxθ/(π×fs/2)) to shift the phase of the input complex spectrum for synchronization, where the angle θ indicates the angular direction θ=−π/2 of the target sound spectral component at the frequency f originating from the target sound source SS in FIG. 1 to be enhanced.

By employing the filter unit 302 or 304 of FIG. 6 or 7 in place of the filter unit 300 of FIG. 4B, the target sound spectral component originating from the target sound source SS may be enhanced. Thus, a noise component other than the target sound component originating from the target sound source SS may be reduced relatively.

Alternatively, the virtual sound signals IN0(t) and IN3(t) in the time domain of FIG. 3B assumed to be received from the virtual microphones MIC0 and MIC3 may be used to perform the filtering process for enhancement of the target sound component originating from the target sound source SS in the time domain, in a manner similar to the noise suppression described above.

The elements 212, 214, and 220 to 224 of FIG. 3A, the elements 212 to 220, 300 to 344, and 382 of FIGS. 4A, 4B and 5, and the elements 302 to 336 of FIGS. 6 and 7 may be considered as flow diagrams which are executed by the digital signal processor 200 implemented as an integrated circuit or operating according to an implemented program.

Figure 8:
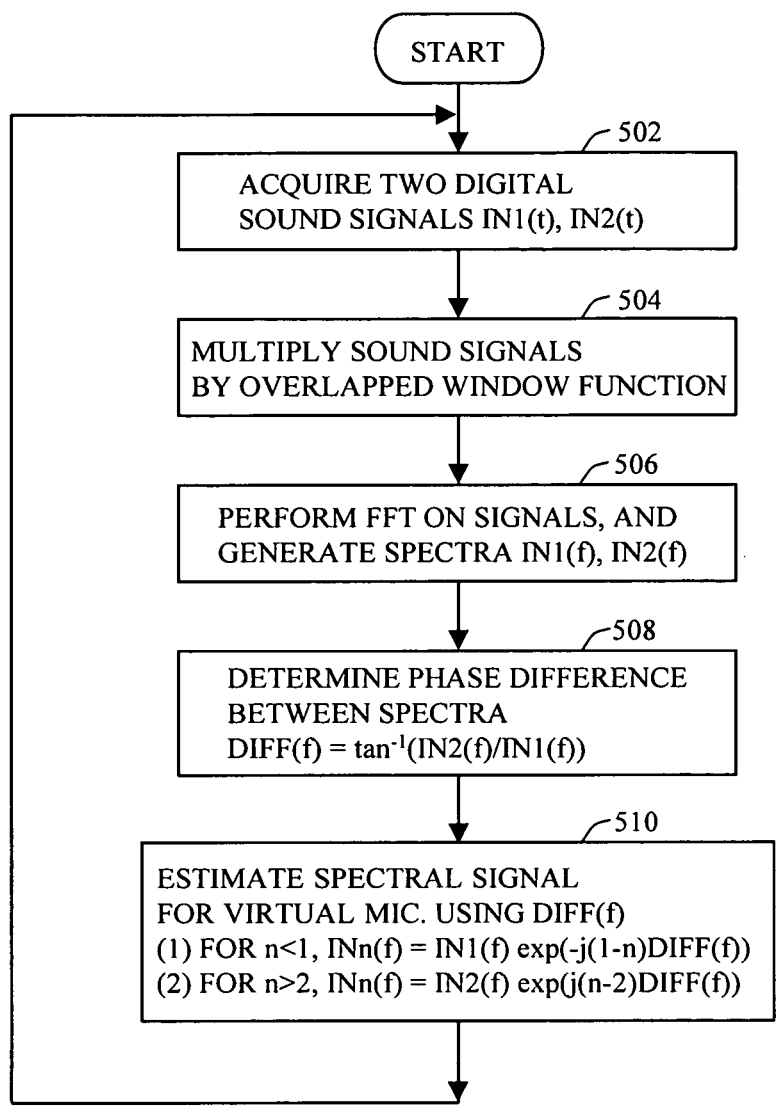
FIG. 8 is an example of an operation chart for generating a virtual complex spectrum, which is executed by the digital signal processor of FIG. 3A in accordance with a program store in a memory.

FIG. 8 is an example of an operation chart for generating a virtual complex spectrum, which is executed by the digital signal processor 200 of FIG. 3A in accordance with a program store in the memory 202. Thus, this operation chart may provide the function provided by the elements 212, 214 and 220 of FIG. 3A.

Referring to FIGS. 3A and 8, at Operation 502, the digital signal processor 200 (the fast Fourier transformers 212 and 214) receives the two digital sound signals IN1(t) and IN2(t)

in the time domain provided by the respective analog-to-digital converters 162 and 164.

At Operation 504, the digital signal processor 200 (each of the fast Fourier transformers 212 and 214) multiplies each of the two digital sound signals IN1(*t*) and IN2(*t*) by an overlapped window function.

At Operation 506, the digital signal processor 200 (the fast Fourier transformers 212 and 214) performs the fast Fourier transform on the digital sound signals IN1(*t*) and IN2(*t*) to generate complex spectra IN1(*f*) and IN2(*f*) in the frequency domain.

At Operation 508, the digital signal processor 200 (the phase difference generator unit 222 of the virtual signal spectrum generator unit 220) determines or computes the phase difference DIFF(f)=tan$^{-1}$(IN2(*f*)/IN1(*f*)) between the complex spectra IN1(*f*) and IN2(*f*).

At Operation 510, in accordance with the phase difference DIFF(f), the digital signal processor 200 (the virtual signal spectrum estimator unit 224 of the virtual signal spectrum generator unit 220) estimates the virtual complex spectra IN0(*f*) and IN3(*f*) in the frequency domain of the virtual sound signals received from the virtual microphones MIC0 and MIC3 at their virtual positions.

For n<1, the digital signal processor 200 determines or computes, with reference to the complex spectrum IN1(*f*) of the microphone MIC1, a virtual complex spectrum INn(f)= IN1(*f*)·exp(−j(1−n)DIFF(f)), which is provided as an output.

For n>2, the digital signal processor 200 determines or computes, with reference to the complex spectrum IN2(*f*) of the microphone MIC2, a virtual complex spectrum INn(f)= IN2(*f*)·exp(j(n−2)DIFF(f)), which is provided as an output.

Then, the procedure returns to Operation 502. Operations 502 to 510 are repeated for a desired number of times for processing the received sound signal over a desired period of time.

According to the embodiments as described above, a limited number of microphones MIC1 and MIC2 are used to produce a sound signal with a relatively reduced noise, and the sound signals from the limited number of microphones are processed in the frequency domain to produce a sound signal with a relatively reduced noise. The processing of sound signals in the frequency domain may provide a more accurate detected phase difference than the processing of such sound signals in the time domain, and hence may produce a high quality sound signal with a reduced noise.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A signal processing device comprising:
    an orthogonal transformer to orthogonally transform two sound signals in a time domain received from first and second sound signal input elements at different positions into two spectral signals in a frequency domain, to generate first and second spectra, respectively;
    a phase difference determiner to determine a phase difference between the first and second spectra for each frequency; and
    a virtual spectrum generator to shift a phase of each spectral component of one spectrum of the first and second spectra, in accordance with the phase difference for each frequency, positions of the first and second sound signal input elements, and a virtual position of a virtual sound signal input element, to thereby generate a virtual spectrum for the virtual sound signal input element, and
    wherein the virtual spectrum is assumed as generated for a virtual sound signal from a virtual sound signal input element located at a virtual position outside a segment of the first and second sound signal input elements on a straight line passing through positions of the first and second sound signal input elements, and
    wherein when a distance between the first and second sound signal input elements is greater than a value of a velocity of sound divided by a sampling rate for the two sound signals, the virtual spectrum generator generates the virtual spectrum in a range of frequencies which is smaller than a value of the velocity of sound divided by twice the distance.

2. The signal processing device according to claim 1, further comprising:
    a filter to synchronize and combine one of the one spectrum and the virtual spectrum with the other for particular frequencies to generate a first combined spectrum, and synchronize and combine one of the first and second spectra with the other for the particular frequencies to generate a second combined spectrum, and further synchronize and combine one of the first combined spectrum and the second combined spectrum with the other for the particular frequencies to generate a third combined spectrum.

3. The signal processing device according to claim 1, further comprising:
    a filter to synchronize one of the virtual spectrum and the one spectrum with the other for particular frequencies in a manner to suppress a sound component in an angular direction that is received from one of the first and second sound signal input elements and a virtual sound signal input element for each of the particular frequencies, and determine a subtractive difference between the synchronized one spectrum and the other spectrum to generate a first difference spectrum,
    synchronize one of the first and second spectra with the other for the particular frequencies in a manner to suppress a sound component in the angular direction that is received from another one of the first and second sound signal input elements for each of the particular frequencies, and determine a subtractive difference between the synchronized one spectrum and the other spectrum to generate a second difference spectrum,
    synchronize one of the first difference spectrum and the second difference spectrum with the other for the particular frequencies in a manner to suppress a sound component in a different angular direction that is received from one of the first and second sound signal input elements and the virtual sound signal input element for each of the particular frequencies, and determine a subtractive difference between synchronized one spectrum and the other spectrum to generate a third difference spectrum.

4. The signal processing device according to claim 1, further comprising:
    a filter to synchronize one of the virtual spectrum and the one spectrum with the other for particular frequencies in a manner to enhance a sound component in an angular direction that is received by one of the first and second sound signal input elements for each of the particular frequencies, and determine a sum of the synchronized one spectrum and the other spectrum to generate a first sum spectrum, synchronize one of the first and second spectra with the other for particular frequencies in a manner to enhance a sound component in the angular direction that is received by one of the first and second sound signal input elements for each of the particular frequencies, and determine a sum of the synchronized one spectrum and the other spectrum to generate a second sum spectrum, synchronize one of the first sum spectrum and the second sum spectrum with the other for particular frequencies in a manner to enhance the sound component in the angular direction that is received by one of the first and second sound signal input elements for each of the particular frequencies, and determine a sum of the synchronized one sum spectrum and the other sum spectrum to generate a third sum spectrum.

5. The signal processing device according to claim 1, wherein the virtual spectrum generator determines an average of amplitudes of the first and second spectra as an amplitude of the virtual spectrum.

6. The signal processing device according to claim 1, wherein the distance between the first and second sound signal input elements is smaller than the value of the velocity of sound divided by the sampling rate for the two sound signals.

7. The signal processing device according to claim 1, wherein the positions of the first and second sound signal input elements and the virtual sound signal input element are assumed to be arranged on a straight line at equal intervals.

8. A method of processing a signal in a signal processing device comprising two sound signal input elements, the method comprising:
   orthogonally transforming two sound signals in a time domain received from first and second sound signal input elements at different positions into two spectral signals in a frequency domain, to generate first and second spectra, respectively;
   determining a phase difference between the first and second spectra for each frequency; and
   shifting a phase of each spectral component of one spectrum of the first and second spectra, in accordance with the phase difference for each frequency, positions of the first and second sound signal input elements, and a virtual position of a virtual sound signal input element, to thereby generate a virtual spectrum for the virtual sound signal input element, and
   wherein the virtual spectrum is assumed as generated for a virtual sound signal from a virtual sound signal input element located at a virtual position outside a segment of the first and second sound signal input elements on a straight line passing through positions of the first and second sound signal input elements, and
   wherein when a distance between the first and second sound signal input elements is greater than a value of a velocity of sound divided by a sampling rate for the two sound signals, the generated virtual spectrum is in a range of frequencies which is smaller than a value of the velocity of sound divided by twice the distance.

9. A non-transitory computer-readable storage medium storing a program for use in a signal processing device comprising two sound signal input elements, the program causing the signal processing device to execute:
   orthogonally transforming two sound signals in a time domain received from first and second sound signal input elements at different positions into two spectral signals in a frequency domain, to generate first and second spectra, respectively;
   determining a phase difference between first and second spectra for each frequency; and
   shifting a phase of each spectral component of one spectrum of the first and second spectra, in accordance with the phase difference for each frequency, positions of the first and second sound signal input elements, and a virtual position of a virtual sound signal input element, to thereby generate a virtual spectrum for the virtual sound signal input element, and
   wherein the virtual spectrum is assumed as generated for a virtual sound signal from a virtual sound signal input element located at a virtual position outside a segment of the first and second sound signal input elements on a straight line passing through positions of the first and second sound signal input elements, and
   wherein when a distance between the first and second sound signal input elements is greater than a value of a velocity of sound divided by a sampling rate for the two sound signals, the generated virtual spectrum is in a range of frequencies which is smaller than a value of the velocity of sound divided by twice the distance.

* * * * *